UNITED STATES PATENT OFFICE 2,537,078

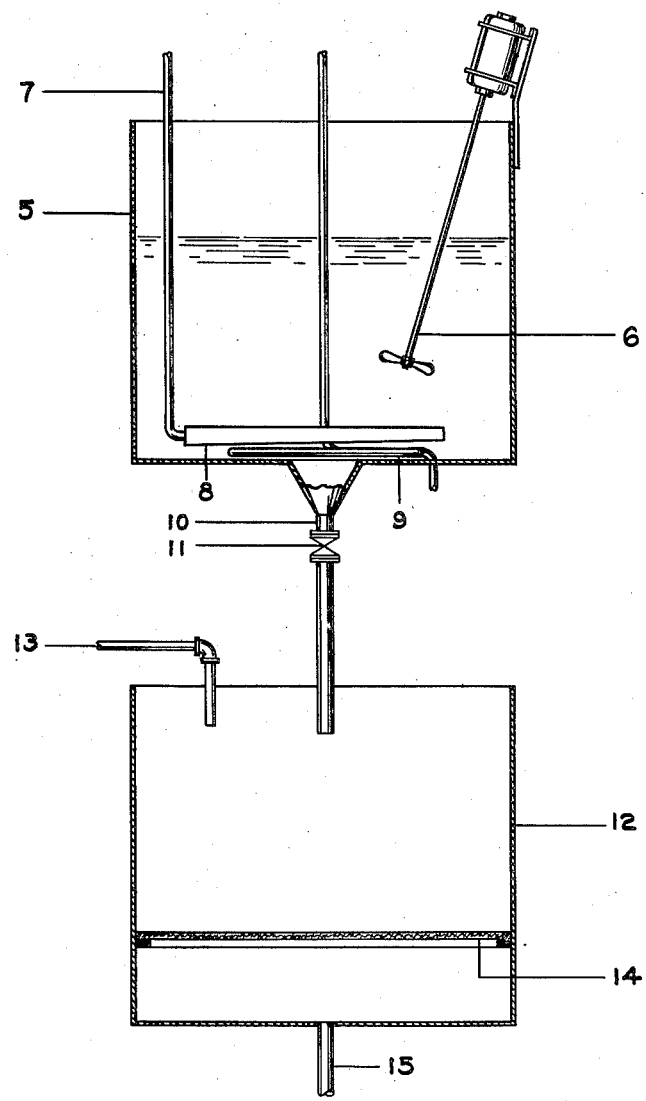

PURIFICATION OF RED PHOSPHORUS

Philip Miller, New York, N. Y., assignor to Tennessee Valley Authority, a corporation of the United States Application April 1, 1948, Serial No. 18,355

2 Claims. (Cl. 23—223)

(Granted under the act of March 3, 1883, as amended April 30, 1928; 370 O. G. 757)

The invention herein described may be manufactured and used by or for the Government for governmental purposes without payment to me of any royalty thereon.

This invention relates to improvement in methods for purifying red phosphorus. In one particular aspect it relates to improved methods for simultaneously removing yellow phosphorus and iron from red phosphorus and in another particular aspect it relates to improved methods for stabilizing freshly prepared red phosphorus against spontaneous combustion due to atmospheric oxidation without the necessity for coating the particles of phosphorus with an inert material.

It has long been known that yellow phosphorus may be removed from red phosphorus by dissolving the yellow phosphorus in carbon disulphide, benzene, or other organic solvent. However, such solvents are very expensive and most organic solvents are inflammable, and, consequently, are too dangerous to handle in conjunction with yellow phosphorus. Therefore, the solvent extraction method has not been used commercially.

In commercial methods for converting yellow phosphorus to red phosphorus, the product frequently contains impurities such as iron, copper, and unconverted yellow phosphorus. Yellow phosphorus is frequently present in such quantities that the product is autoinflammable.

The usual commercial practice is to effect removal of yellow phosphorus by boiling the conversion product for from two to four hours in a five to ten per cent solution of caustic soda or soda ash. In the presence of a strong alkali, yellow phosphorus reacts with water to form phosphine and phosphoric acid. For certain uses of red phosphorus the iron content must be less than 15 parts per million. In addition, the product of iron content in parts per million multiplied by the copper content in parts per million must be less than 125. Since it is difficult to remove the copper, it is customary to meet this requirement by reducing the amount of iron. Iron is ordinarily removed by boiling the red phosphorus with sulphuric acid of from five to ten per cent strength for about four hours.

The methods of the prior art have been found to be unsatisfactory in several respects. The caustic soda or soda ash boil does not always remove sufficient yellow phosphorus to make the red phosphorus non-autoinflammable on drying. Another disadvantage of these methods is that considerable heat is required to maintain the temperature of the slurry of red phosphorus in alkali or in acid above the boiling point. Still another disadvantage is found in the fact that caustic soda or soda ash used as reagents may contain small amounts of copper which will be taken up by the red phosphorus. Boiling with alkali also results in the formation of considerable phosphine which is autoinflammable upon contact with air.

It is an object of this invention to provide a method for stabilizing freshly prepared red phosphorus against autoinflammability when exposed to air.

Another object is to provide a method for simultaneously removing yellow phosphorus and iron from red phosphorus.

Still another object is to provide a method for purifying red phosphorus which is cheap, efficient, and convenient in operation and which requires a minimum of heat.

Other objects and advantages will become apparent as this disclosure proceeds.

I have now found that these disadvantages of the methods of the prior art may be easily eliminated by suspending freshly prepared red phosphorus containing yellow phosphorus and iron in an aqueous medium which may be and is preferably ordinary water and by bubbling air or other oxygen-containing gas through the resulting slurry at temperatures well below the boiling point. By proceeding in this manner, yellow phosphorus is preferentially oxidized and a portion of the phosphorus oxides thus formed is absorbed in the aqueous medium. By this treatment the yellow phosphorus content is reduced to such extent that the product is non-autoinflammable and the action of the acids of phosphorus formed as a result of the treatment causes extraction of iron from the red phosphorus in an amount sufficient to reduce the iron content to the desired level. When operating in this manner the red phosphorus is very finely divided, preferably at least 90 per cent being fine enough to pass a standard 100 mesh screen and is suspended in the aqueous medium and exposed to fine bubbles of oxygen-containing gas in such manner that the gas comes in contact with all parts of the phosphorus suspension. The gas is preferably passed through the slurry in the form of very fine bubbles. The vessel containing the slurry may be equipped with an agitator to keep solids in suspension and prevent them from settling out on the bottom of the tank, although the air itself may provide adequate agitation. It is essential that the temperature of the slurry be kept well below 100° C. I have found that when temperatures as high as 100° C. are used that the red phosphorus burns at the surface of the suspension. My process is operable at ordinary room temperatures when the removal of yellow phosphorus is the principal object. Some iron is also removed at room temperatures but the removal is not so efficient as when the temperatures are somewhat elevated. For the removal of iron I have found that a temperature in the range from about 60 to about 80° C. is most effective.

The accompanying drawing shows diagrammatically one type of apparatus adapted for use in the process of my invention. Referring thereto, a vessel 5 is shown containing a slurry of finely divided red phosphorus and water. A motor driven agitator 6 is provided to prevent undue settling of the slurry. Air under pressure is conducted from a source not shown to a porous carbon thimble 8 immersed in a lower part of the slurry which may be warmed if desired by steam coils 9. Agitation of the slurry and introduction of air in the form of very fine bubbles is continued for a period of about 4 to 7 hours. The resulting slurry is then removed via line 10 containing valve 11 to means for washing and filtering, shown as a filter plate 14 disposed within a housing 12 and adapted to receive water for washing from line 13. Filtrate or wash water may be removed from housing 12 via line 15.

*Example 1*

Laboratory-scale experiments were conducted to determine the effectiveness of this method in the removal of yellow phosphorus and iron. These were carried out in a vertical glass tube 2½ inches in diameter by 18 inches long fitted with a fritted glass disc near the bottom of the tube. This fritted disc served as an equivalent for the porous carbon thimble 8 described above and shown in the drawing. A slurry containing 20 per cent by weight of red phosphorus suspended in water was introduced into the tube to a depth of 6 inches above the porous false bottom; the red phosphorus was of such size that 99 per cent was minus 100 mesh. A metered stream of air under sufficient pressure to permit passage of the air through the fritted glass disc and through the slurry was introduced beneath the disc at a rate of 0.15 cubic foot per minute standard temperature and pressure. The slurry inside the tube was heated by means of a Bunsen burner. The slurry was maintained at temperatures in the range from 80 to 90° C. The starting material was a sample of finely divided, freshly prepared red phosphorus, which was autoinflammable when dry. This material contained four parts per million of copper. Each test was made in duplicate. In test 1 the aeration treatment was continued for 7 hours, the product was separated by filtration and dried without washing. In test 2 the aeration treatment was continued for 7 hours and the product was washed with water on the filter before it was dried. In test 3 the aeration treatment was continued for 24 hours and the product was washed with water on the filter before drying. The average iron content of the starting material was 40 parts per million. In test 1 this was reduced to 24 parts per million, in test 2, to 10 parts per million and in test 3 to 12 parts per million. In each case the product obtained was non-autoinflammable. Significant amounts of iron were removed in all cases but there was no significant increase in efficiency of iron removal after the 7 hour period. The greatest difference was noticed between samples which were washed before filtering and those which were not washed. The product of iron content times copper content was originally 160 and this was reduced to 120, 76 and 52 in tests 1, 2 and 3 respectively. The degree of iron removal was comparable to that generally obtained by boiling with sulfuric acid. In all the tests white fumes of phosphorus pentoxide were given off for the first three or four hours of aeration and then gradually disappeared.

*Example 2*

A number of tests on a larger scale were made. In these, batches of red phosphorus weighing about 350 pounds were made up to about 150 gallons of slurry with water. This slurry was introduced into a stainless steel tank 3 feet in diameter by 4 feet deep and air at the rate of 10 cubic feet per minute was introduced through a porous carbon diffuser 3 inches in diameter by 18 inches long installed horizontally at the bottom of the tank. Temperatures of the order of 60 to 80° were found excellent for this process, although tests at room temperature, i. e. about 20° C., were also made. In all cases when aeration was started, dense, white fumes of phosphorus pentoxide were evolved; the passage of air was continued until these fumes were no longer visible, which usually required about 4 to 7 hours. The average pH of the final solution was approximately 2. In every case the red phosphorus treated by this method was non-autoinflammable and was of the required grade, although it was found that the removal of iron at room temperature was not as great as that when temperatures of the order of 60 to 80° were used. A series of check runs was made in which red phosphorus similarly produced and similar in grade to the starting material was treated in a series of tests by boiling with soda ash solution according to the usual commercial procedure. In a significant number of these cases the treated material after drying was autoinflammable, whereas in no case was the phosphorus autoinflammable after being treated according to the method of my invention.

The advantages of my process over the usual methods of the prior art are, first, that the treatment is more effective in the removal of residual yellow phosphorus than is the treatment with caustic soda or soda ash. Yellow phosphorus and iron are removed in one step, thus cutting down on the time and labor necessary in the purification. Since boiling is not necessary in the present invention less heat is required than in the prior methods. The possibility of increasing the copper content of the red phosphorus is much less. Red phosphorus is well known to have a strong affinity for copper so that the small amounts of copper present in caustic soda or soda ash used in other processes is usually taken up by the red phosphorus. In contrast, air and water are the only reagents necessary in my process. No autoinflammable phosphine is formed in my process in distinction from the caustic soda process. I also have found that very much less washing is necessary when red phosphorus is treated by my process than in similar red phosphorus treated by the caustic soda process.

Having described my invention and explained its operation, I claim:

1. A process for concomitantly removing iron and yellow phosphorus from red phosphorus contaminated with iron in excess of 15 parts per million and further contaminated with sufficient yellow phosphorus to be autoinflammable in air, which comprises suspending such contaminated red phosphorus in water, in a state of division sufficiently fine that no less than 90 per cent of said phosphorus will pass through a 100-mesh screen; passing air in fine bubbles through the resulting slurry until evolved white fumes are no longer visible; maintaining the temperature of the slurry in the range from 60° to 80° C.; maintaining the finely divided phosphorus in suspension by agitating the slurry; separating the resulting partially purified phosphorus from the resulting acidulated water; washing the seprated phosphorus with water; and separating the resulting non-autoinflammable red phosphorus containing less than 15 parts per million of iron from the water used for washing the same.

2. A process for concomitantly removing iron and yellow phophorus from red phosphorus contaminated with iron in excess of 15 parts per million and further contaminated with sufficient yellow phosphorus to be autoinflammable in air, which comprises suspending such contaminated red phophorus in water, in a state of division sufficiently fine that not less than 90 per cent of said phosphorus will pass through a 100-mesh screen; rapidly passing air in fine bubbles through the resulting slurry from 4 to 7 hours; maintaining the temperature of the slurry in the range from 60° to 80° C.; maintaining the finely divided phosphorus in suspension by agitating the slurry; separating the resulting partially purified phosphorus from the resulting acidulated water; washing the separated phosphorus with water; and separating the resulting non-autoinflammable red phosphorus containing less than 15 parts per million of iron from the water used for washing the same.

PHILIP MILLER.

REFERENCES CITED

The following references are of record in the file of this patent:

UNITED STATES PATENTS

| Number | Name | Date |
|---|---|---|
| 2,359,243 | Pernert | Sept. 26, 1944 |

FOREIGN PATENTS

| Number | Country | Date |
|---|---|---|
| 13,695 | Great Britain | A. D. 1851 |

OTHER REFERENCES

Mellor: "A Comprehensive Treatise on Inorganic and Theoretical Chemistry," vol. 8, 1928, ed., p. 772. Longmans, Green & Co., N. Y., publishers.

McPherson & Henderson: "A Course in General Chemistry," 3d. ed., pp. 385, 386. Ginn & Co., N. Y., publishers.

Thorpe: "Dictionary of Applied Chemistry," vol. 9, 4th ed., p. 484. Longmans, Green & Co., N. Y., publishers.